G. W. WEISS.
MACHINE FOR MAKING WAISTBANDS.
APPLICATION FILED FEB. 17, 1919.

1,341,092.

Patented May 25, 1920.
5 SHEETS—SHEET 1.

Inventor
George W Weiss

G. W. WEISS.
MACHINE FOR MAKING WAISTBANDS.
APPLICATION FILED FEB. 17, 1919.

1,341,092.

Patented May 25, 1920.
5 SHEETS—SHEET 2.

Inventor
George W Weiss

G. W. WEISS.
MACHINE FOR MAKING WAISTBANDS.
APPLICATION FILED FEB. 17, 1919.
1,341,092.
Patented May 25, 1920.
5 SHEETS—SHEET 3.
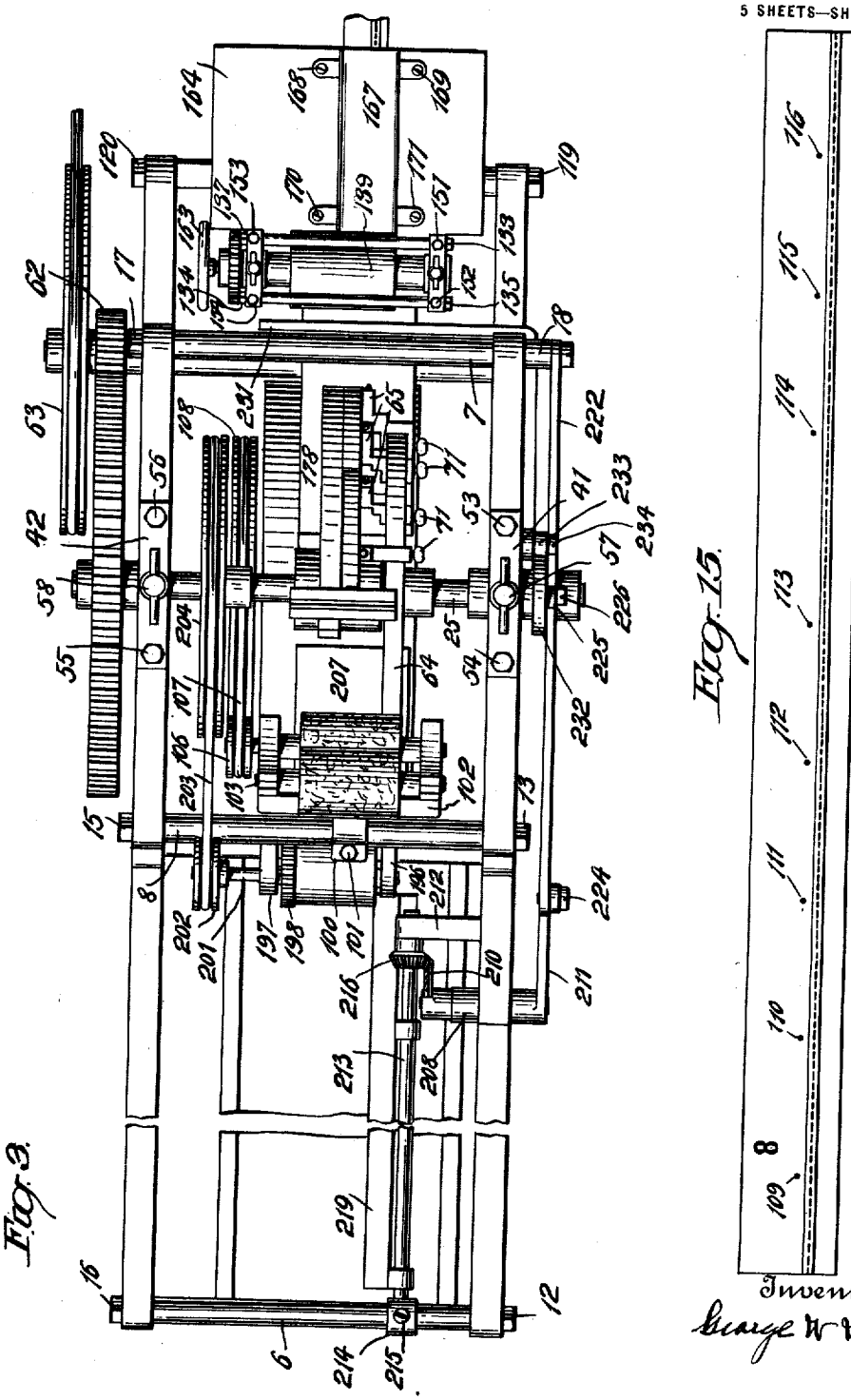

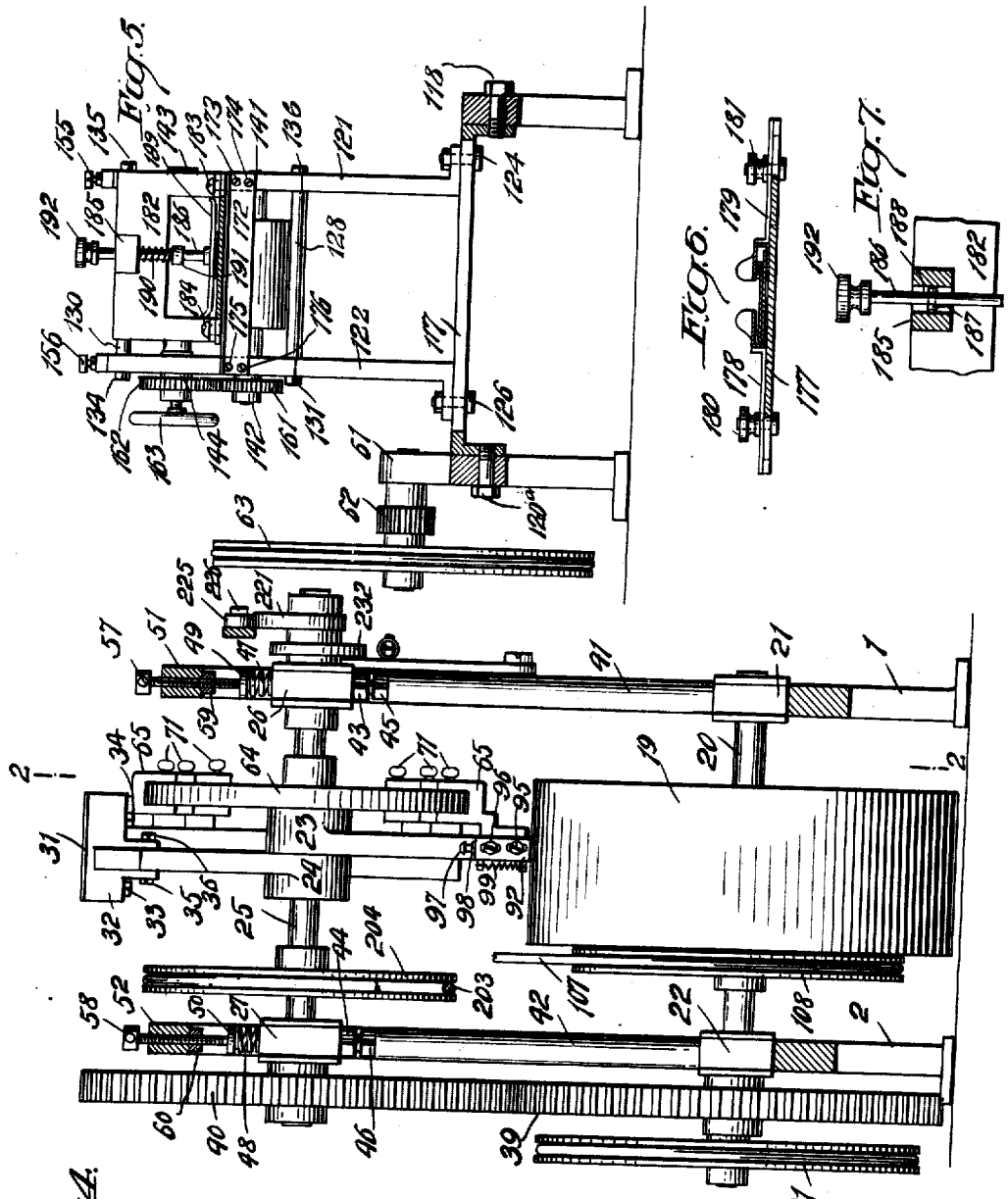

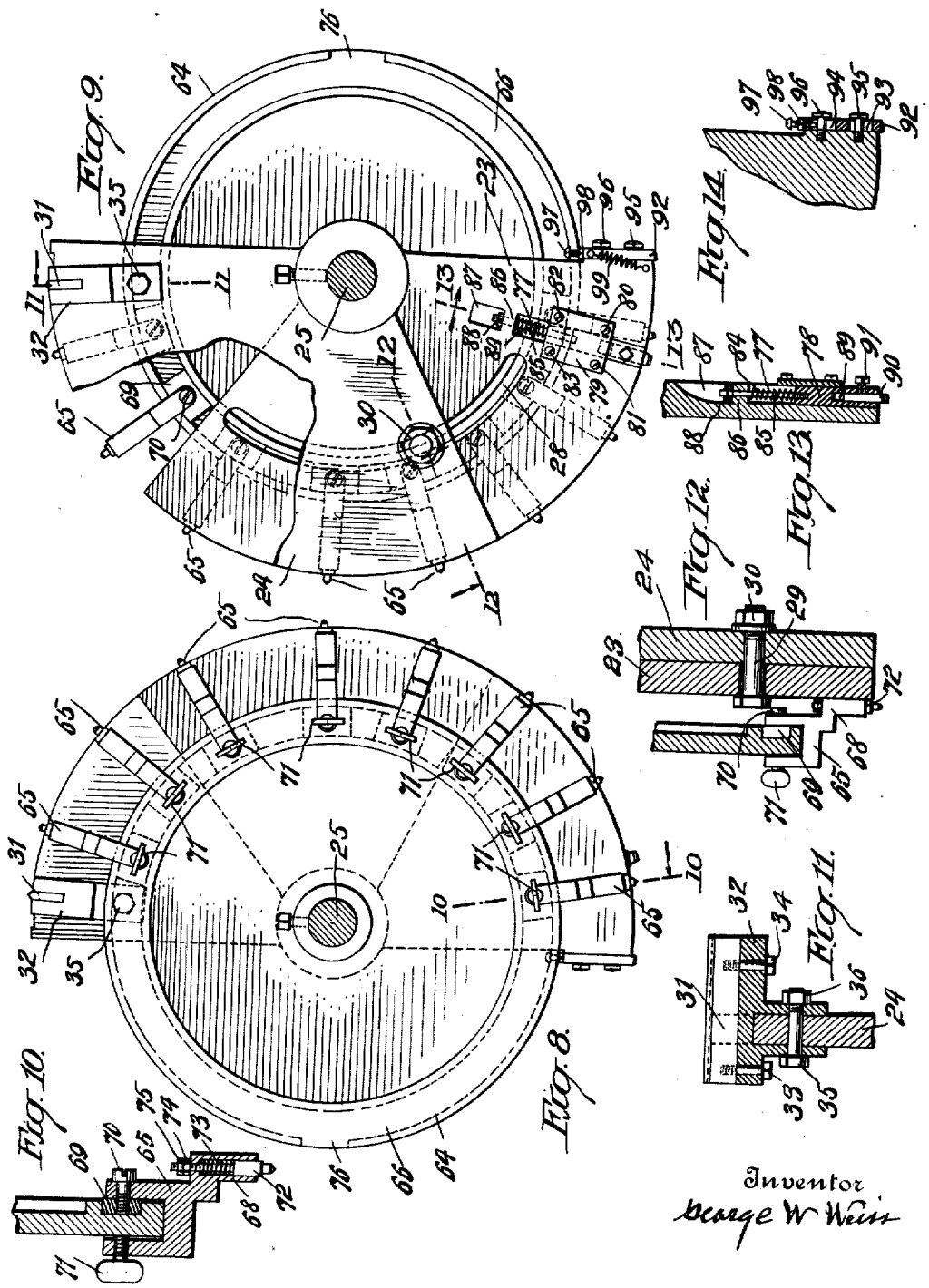

UNITED STATES PATENT OFFICE.

GEORGE W. WEISS, OF NEW YORK, N. Y.

MACHINE FOR MAKING WAISTBANDS.

1,341,092.   Specification of Letters Patent.   Patented May 25, 1920.

Application filed February 17, 1919. Serial No. 277,446.

*To all whom it may concern:*

Be it known that I, GEORGE W. WEISS, a citizen of the United States, and resident of New York city, in the county of New York and State of New York, have invented certain new and useful Improvements in Machines for Making Waistbands, of which the following is a full, clear, and exact description.

This invention relates to machines for making waist bands that are used on boys' knee pants and other garments of like nature, and has for its object the construction of a machine that combines means for folding, measuring, marking, numbering, cutting and piling up the bands.

Another object of the invention is to provide means for adjusting the length of the band and the position of the marking devices in a simple, practical and efficient manner.

In former machines of this type, the changes of length were made by having rollers, the circumference of which determined the length of the band, each roller making a different length band and it was necessary to change the rollers each time another size band was required. The bands being from 18 to 30 inches in length, and varying by half inches, it was necessary to have 25 rollers, which was an expensive matter, in addition to the time consumed in making the change. My invention makes these rollers unnecessary.

With these and other objects in view, my invention consists in the novel construction, arrangement and formation of parts as will be hereinafter specifically described, illustrated and claimed.

Reference is to be had to the accompanying drawings in which similar characters of reference indicate corresponding parts in all the figures.

Figure 1:
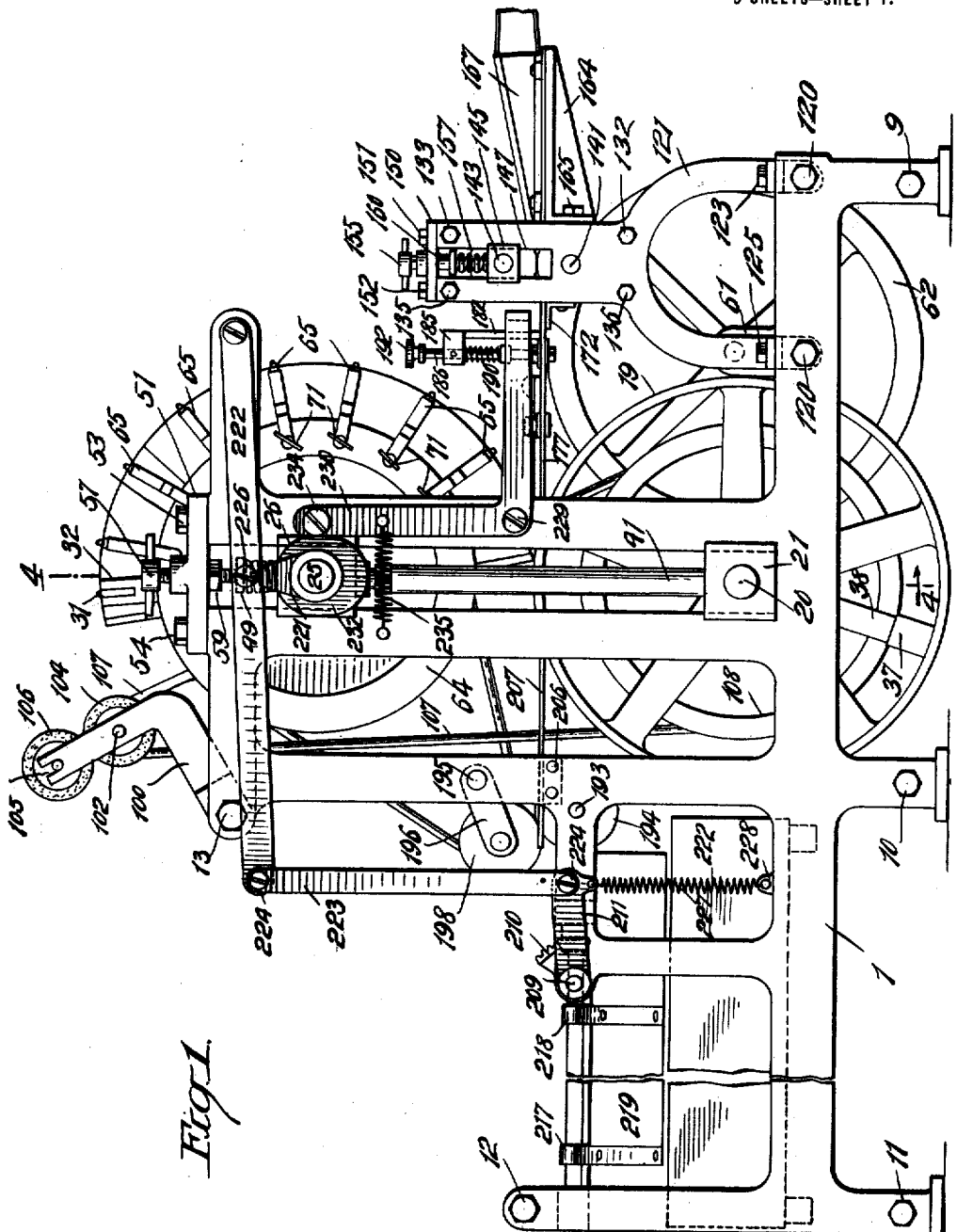
Figure 2:
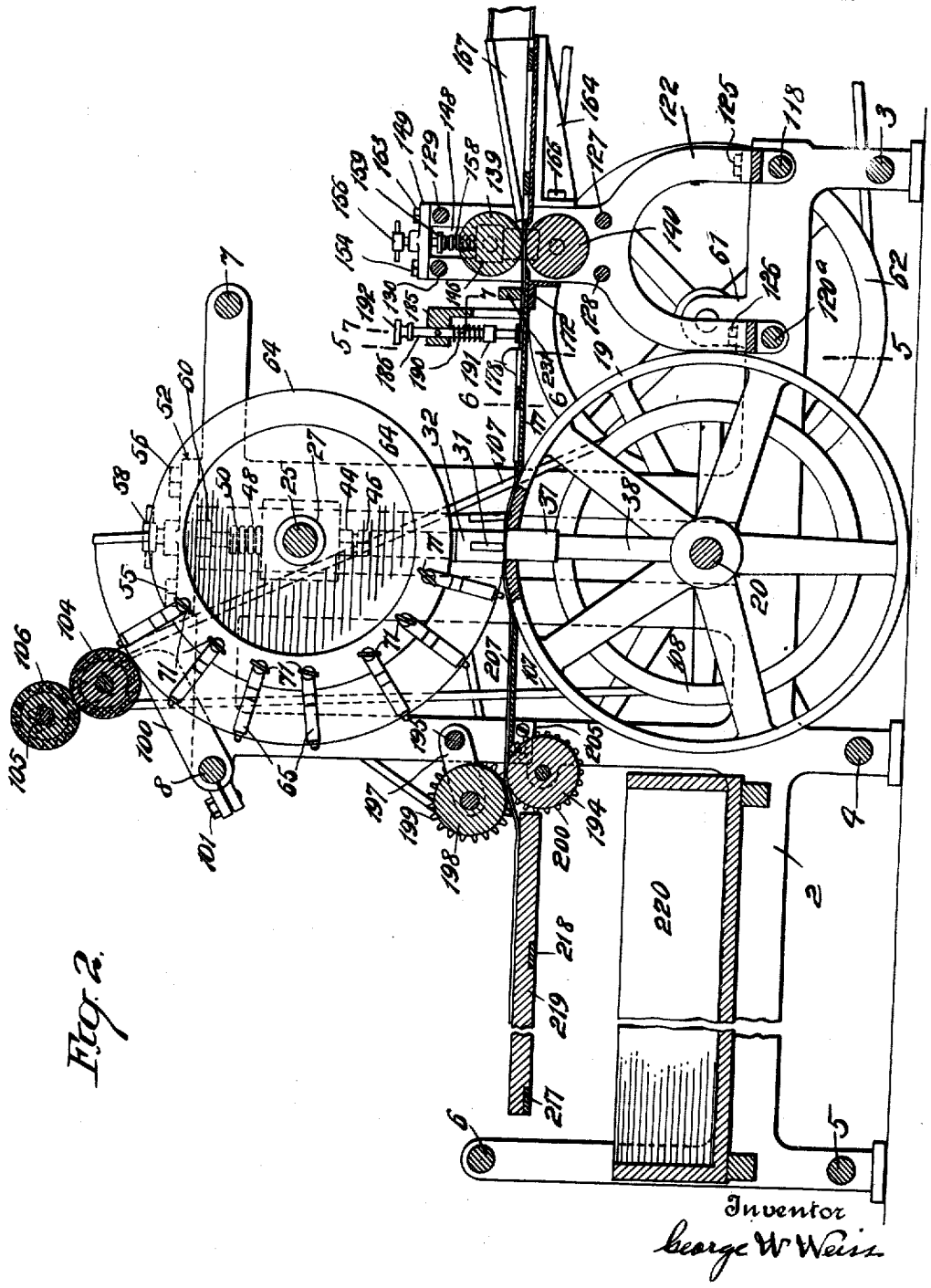

Figure 1 is a side elevation.
Fig. 2 is a section on line 2—2 of Fig. 4.
Fig. 3 is a plan view.
Fig. 4 is a section on line 4—4 of Fig. 1.
Fig. 5 is a section on line 5—5 of Fig. 2.
Fig. 6 is a section on line 6—6 of Fig. 2.
Fig. 7 is a section on line 7—7 of Fig. 2.
Fig. 8 is an elevation showing in detail the marking, cutting, and adjusting means.
Fig. 9 is a rear view of same.
Fig. 10 is a section on line 10—10 of Fig. 8.
Fig. 11 is a section on line 11—11 of Fig. 9.
Fig. 12 is a section on line 12—12 of Fig. 9.
Fig. 13 is a section on line 13—13 of Fig. 9.
Fig. 14 is an enlarged sectional view of the gripper.
Fig. 15 is a view of the product.

In the construction of my improved machine, I provide side frames 1 and 2, held together by brace rods 3—4—5—6—7—8, which pass through the side frames and are secured with nuts 9—10—11—12—13—15—16—17—18. Supported on the side frames 1 and 2 is a flat wheel 19, which is mounted on shaft 20, the ends of which fit into bearings 21 and 22, which are seated in slots in side frames 1 and 2. Also supported on side frames 1 and 2 are two quadrants 23—24, which are mounted on shaft 25, the ends of which fit in bearings 26—27, which also fit into slots in side frames 1 and 2. These quadrants are both on the same shaft, one being fastened to the shaft and the other movable around the shaft. In quadrant 23, a circular slot 28, is cut through as shown in Fig. 9. Screw bolt 29, passes through the slot in quadrant 23, through quadrant 24 and is fastened with nut 30, thus fastening the two quadrants together in any position they may be set to the limit of the slot 28. The adjustment of these two quadrants determines the length of the waist band.

Secured to quadrant 24, is a cutter 31, which is held in place on the quadrant 24, by a block 32, the cutter 31 being held to the block 32 by screws 33—34 as shown in Fig. 11; the block being held to the quadrant by screw bolt 35, going through quadrant 24 and block 32, and secured therein by nut 36.

Set into wheel 19, is a steel block 37, supported on bar 38. Secured to shafts 20 and 25 are two gears 39 and 40; these cause the shafts 20 and 25 carrying the wheel 19, and the quadrants 23 and 24 to rotate in unison.

As the quadrants are only in contact with the wheel a part of the time it becomes necessary to support the quadrant shaft, quadrants and gear during part of the revolution that they are not in contact. This I accomplish by means of the bars 41 and 42. These are secured to the shaft bearings 21 and 22. At the upper end of bars 41—42 are secured screws 43 and 44, which screws are screwed into bars 41 and 42, and set in position with lock nuts 45 and 46. The shaft bearings 26 and 27 rest on screws 43 and 44. This supports the shaft bearings and quadrants in proper relation to the wheel 19.

Above bearings 26 and 27 are seated springs 47 and 48 and buttons 49 and 50. At the top of side frames 1 and 2 are top pieces 51 and 52 held in place by screws 53—54—55—56. Fitted into parts 51—52 are tension screws 57—58. These are screwed into and through top pieces 51 and 52 and press on the buttons 49 and 50 and through the buttons on springs 47 and 48. These springs keep the quadrants in contact with wheel 19, with sufficient pressure to make the cutter cut the goods. Mounted on projection 61 of frame 2 is pinion 62, which meshes into gear 39.

Secured to pinion 62, is a drive pulley 63. Secured to tension screws under the top pieces 51 and 52 are lock nuts 59 and 60. These keep the tension screws in whatever position they are set and prevent them from working loose.

Supported on shaft 25, next to the quadrants 23 and 24, is a disk 64, which supports the marking attachments 65; the disk 64 has a groove 66 turned into one of its sides. The marking attachment is composed of a U shaped piece 65 with an extension 68. Secured to the inside of the U part is a slide 69, which fits into groove 66, of disk 64, so that it will move freely around in the groove 66. Slide 69 is secured to U part with screw 70. Secured in the U part, opposite the slide 69, is a thumb screw 71, which serves to tighten the marking attachment in position. Mounted in the extension 68 of the U shaped piece, is a plunger 72, as shown in Fig. 10, on which is a spring 73. The plunger is pointed to make a dot in ink on the waistband. On the opposite end of plunger are two nuts 74 and 75. Nut 74 is for adjusting the position of the plunger 72, and nut 75 is for locking nut 74 in position.

There are as many marking devices as there are marks to be made on the band to indicate the position of the buttonholes. In the waist band shown in Fig. 15, there are eight marks and in Fig. 8, I have shown 8 marking devices. These marking devices can be set at any position in relation to the length of the band, there being eight marks in each band. If the band is longer or shorter, the marking devices are to be set accordingly. If for any reason it is desired to remove any of the marking devices it can be done as follows:

In the disk 64, I have cut away a portion of the outside wall of the groove as shown in Figs. 8 and 9 at 76, in order that by sliding the marking devices around to the cut away portion, they can be removed from the disk.

Secured to quadrant 23 is a numbering device. A groove 77 is cut into the side of the quadrant. In this groove is fitted the plunger 78, see Fig. 13. A plate 79 is secured to the quadrant by screws 80—81—82—83, which keeps the plunger 78 in the groove 77. The plunger has a stem 84, on which is a spring 85, which serves to keep the plunger in proper position.

At the bottom of groove 77, is a bearing 86, which supports the stem 84. Below bearing 86 is a recess 87, into which the stem 84 projects. At the end of stem 84 is a collar 88, which controls the regulation of the plunger 78. The plunger 78 is provided with a socket 89. In this socket is fitted a stud 90, which is held in place by a screw 91, and at the top of the stud is engraved the number to be marked in the band. These studs are interchangeable with others that have all the numbers that may be needed.

Secured to the edge of quadrant 23 is a gripper which consists of slide 92, with slots 93 and 94. This slide 92 is secured to quadrant 23 by two screws 95 and 96, which screw into the edge of the quadrant, as shown in Fig. 14, through the slots 93 and 94. In the end of slide 92 is fitted a screw 97, held in place with nut 98. Screw 97 regulates the position of the slide in relation to the edge of the quadrant. Secured to slide 92 at one end and to quadrant 23 at the other end is a spring 99, which keeps the slide 92 in its operating position. Supported on brace rod 8 is a bracket 100, the end surrounding the brace rod being slotted, and being clamped to the rod by screw 101. Supported on bearings 102 and 103 is an ink roller 104. Supported in slots 105 at the end of bracket 100 is another ink roller 106, see Figs. 1 and 2. Secured to an extension of the spindle upon which ink roller 104 revolves is a belt pulley 106. Pulley 106 is connected by belt 107 with pulley 108 on shaft 20, which causes rotation of ink roller 104. When the machine is in operation the ink roller 106, fitting into slot 105 of bracket 100, rests by its own weight on the ink roller 104. Ink being put on roller 106 and the machine being operated, the ink from roller 106 will be evenly distributed on roller 104. The position of bracket 100 is such that the marking points 72 will just touch in going by the roller 104, thus taking sufficient ink to mark the points on the band as shown by 109—110—111—112—113—114—115—116.

Supported on side frames 1 and 2 is a plate 117, which is secured to frames 1 and 2 by screw bolts 118—119—120—120ª.

Supported on plate 117 are secondary side frames 121—122. These are secured to plate 117 by bolts 123—124—125—126. The secondary side frames are held together by brace rods 127—128—129—130, fastened on the outside of the frame with nuts of which seven, 131—132—133—134—135—136—137 are shown. Mounted in the secondary side frames 121—122 are rollers 139—140, roller 140 having a bearing 141 and 142 in frames 121—122, and roller 139 having a bearing 143 and 144 in sliding blocks 145 and 146, which slide in openings 147 and 148 in frames 121—122. Top pieces 149 and 150 are secured to the top of the secondary frames 121 and 122, with screws 151—152—153—154; secured in top pieces 149 and 150 are screws 155 and 156. Supported on blocks 145 and 146 are springs 157 and 158. Resting on springs 157 and 158 are buttons 159 and 160. The screws 155 and 156, pressing on buttons 159 and 160 put pressure on the rollers. Secured to rollers 139 and 140 are gears 161 and 162, which cause the rollers to turn in unison. Secured to bearing 144 of roller 139 is a hand wheel 163 with which the roller can be turned. Secured to frames 121 and 122 is a shelf 164, fastened by screws 165 and 166 to the frames. Shelf 164 supports folder 167 which is secured to shelf 164 by screws 168—169—170—171.

Secured to side frames 121 and 122 is an angle bar 172, which is fastened to frames 121—122 by screws 173—174—175—176. Supported on angle bar 172 is a plate 177, which bridges the space between rollers 139—140 and wheel 19, so that the band coming from the rollers 139—140 will be held up in position to be acted upon by the measuring, marking, numbering and cutting device.

On plate 177 are two gages 178—179, which are fastened with thumb screws 180—181, see Fig. 6. These guide the folded band to the measuring and marking devices. Supported on plate 177 is an upright 182, which is fastened to plate 177 by screws 183—184. Upright 182 carries a block 185 which supports a rod 186 so that it can move freely up and down. Rod 186 has a pin 187, see Fig. 7, and block 185 has a slot 188 into which pin 187 fits; this allows rod 186 to move up and down without turning on its axis.

To the lower end of rod 186 is secured foot 189, also on rod 186 is a spring 190. Under spring 190 is a collar 191. Collar 191 regulates the pressure with which foot 189 presses on the goods. At the upper end of rod 186 is a thumb nut 192, which serves as a grip with which to raise the rod when it is desired to put the goods under the foot. Secured in side frames 1 and 2 is a shaft 193, which supports a roller 194; also supported on frames 1 and 2 is shaft 195, to which are secured brackets 196 and 197. In brackets 196 and 197 is secured a roller 198, the ends of which turn in brackets 196 and 197, and the roller 198, being supported on the brackets which are in turn secured to shaft 195, is adapted to swing up and down with its own weight to rest on the roller 194.

Secured to rollers 194 and 198 are gears 199 and 200, which serve to turn the rollers in unison. Attached to a shaft secured to an extension 201 of roller 198 is a pulley 202, to which is connected a belt 203. Mounted on shaft 25 is a pulley 204, with which the pulley 202 is connected by belt 203. When the machine is in operation the pulley 202 is driven by pulley 204, which causes the rollers 194 and 198 to be revolved. These rollers are for the purpose of feeding the waist band from the point where it is cut on the wheel 19, to the piling device, which will be hereinafter described. The above-described mechanism constitutes the auxiliary feeding off device.

Supported on side frames 1 and 2 are brackets 205 and 206, which support plate 207, which spans the space between wheel 19 and rollers 194 and 198, and thereby guides the waist band through rollers 194 and 198, to the piling device mentioned above.

In the side frame 1, is a bearing 208, formed integral therewith, in which is mounted rock shaft 209, to the inner end of which is fastened gear segment 210, and to the outside of which is fastened lever 211. Supported in an extension 212 on the inner side of side frame 1 is a rock shaft 213, the other end of which is supported on bracket 214, secured to brace rod 6 by screw 215. On rock shaft 213, in engagement with gear segment 210 is a gear 216; also supported on rock shaft 213 are brackets 217—218 on which is supported the table 219.

Supported between side frames 1 and 2 is a receptacle 220, which is adapted to receive the waist bands as they are fed through rollers 194 and 198. Secured to shaft 25 is a cam 221. Supported on the outside end of brace rod 7 is a lever 222, to the end of which is connected link 223, by screw 224. The other end of link 223 is connected to lever 211 on rock shaft 209, with screw 224.

Secured to lever 222 is roller 225 and screw 226. Secured to lever 211 is spring 227, the other end of which is secured to an enlargement 228 on frame 1.

When the shaft 25 is being rotated the cam 221 acting on the roller 225, raises the lever 222, this through the medium of the link 223 raises the lever 211; this lever through the rock shaft 209, gear segment 210 and gear 216 causes the table 219 to move downward until it is perpendicular to the side frame, when the waist band will be deposited in the receptacle 220. As soon as the cam has passed the roller 225, the table will rise up under the action of the spring 227 and be in position for the next band.

Secured to frame 1, with screw 229 is a bell crank lever 230, which has an extension 231 at a right angle to the bell crank lever 230. Secured to shaft 25 is a cam 232, which works against roller 233, secured to lever 230 with screw 234.

Secured to lever 230 and frame 1 is a spring 235, which keeps roller 233 against cam 232.

The object of lever 230, with right angle extension is to act as a brake on the waist band material when it is being fed through the machines. I found that when the machine was in motion the material after being cut with cutter 31, had a tendency to move forward a trifle, owing to the momentum caused by the revolution of the quadrants 23 and 24. To overcome this is the object of the bell crank lever 230, and its extension 231. The cam 232 which actuates lever 230 is timed so that the extension 231 will be pressed down on the material at the instant the cutter 31 is cutting, and is held there until the quadrants come around to feed the goods through for another band as shown in Fig. 2.

The operation of my improved machine is as follows:

The material is put into the gage 167, which folds it in half, as shown in Fig. 15. It is then passed between the rollers 139 and 140, under extension of lever 231, under presser foot 189, through gages 178 and 179 up to, under and between the quadrants 23 and 24 and wheel 19.

The machine is then set in motion and the quadrants 23 and 24, coöperating with wheel 19, feed the goods through the length the quadrants are set for, the cutter 31 cutting the goods when it reaches the point of contact with wheel 19. Before the goods are cut the goods pass between the rollers 194 and 198 and are fed along on the table 219. When the goods are cut the rollers 194 and 198 continue feeding the goods until the whole band has been laid on the table 219. As soon as this has occurred the table is tilted downward, and the band is laid into the receptacle 220. As the band is being fed through by the quadrants and wheel, the marking points press on the band and mark the dots from 109 to 116, and the number is also marked at the same time, because while the marking and numbering devices are revolving they come in contact with the inking rollers 104 and 106, so that the points are always being inked.

I do not wish to limit myself to the particular construction shown and described, as various modifications may be made without departing from the spirit of the invention.

What I claim as new and desire to secure by Letters Patent is:

1. In a machine for making waist bands, a two-part quadrant for feeding, measuring and cutting the bands in predetermined lengths, substantially as shown and described.

2. In a machine for making waist bands, an adjustable quadrant for feeding, measuring and cutting bands in predetermined lengths of different sizes, substantially as shown and described.

3. In a machine for making waist bands, a quadrant comprising relatively adjustable sections for intermittently feeding and measuring the bands, and means secured to one of the sections for cutting the bands in predetermined lengths, substantially as shown and described.

4. In a machine for making waist bands, a quadrant for feeding the bands, means secured to the quadrant for cutting the bands and a marking device supported independently of and at one side of the quadrant, substantially as shown and described.

5. In a machine for making waist bands, an adjustable quadrant for feeding the bands, means secured to the quadrant for cutting the bands, a marking device supported independently of and at one side of the quadrant, and a numbering device carried by the quadrant, substantially as shown and described.

6. In a machine for making waist bands, an adjustable quadrant for feeding the bands, means secured to the quadrant for cutting the bands, an adjustable marking device, a numbering device, and a gripping device, substantially as shown and described.

7. In a machine for making waist bands, an adjustable quadrant for feeding the bands, means for cutting the bands secured to the quadrant, an adjustable marking device, a numbering device, a gripping device, and a feeding off device, substantially as shown and described.

8. In a machine for making waist bands, an adjustable quadrant for feeding the bands, means for cutting the bands secured to the quadrant, an adjustable marking device, a numbering device, a gripping device, a feeding off device, and a piling up device, substantially as shown and described.

9. In a machine for making waist bands, an adjustable quadrant for feeding the bands, means for cutting the bands secured to the quadrant, an adjustable marking device, a numbering device, an inking device, a gripping device, a feeding off device, and a piling up device, substantially as shown and described.

10. In a machine for making waist bands, an adjustable quadrant for intermittently feeding the bands, a support for the quadrant, means secured to the quadrant for cutting the bands in predetermined lengths, an adjustable marking device, and means for piling up the finished bands, substantially as shown and described.

11. In a waist band machine, the combination with a double rotary adjustable quadrant for feeding the bands, an adjustable device, a cutting device secured to the quadrant, an auxiliary feeding device, a piling up device, and a device for numbering the bands, substantially as shown and described.

12. In a machine for making waist bands, the combination with an adjustable quadrant, of marking and numbering devices, an inking device, a cutting device secured to the quadrant, a brake device, an auxiliary feeding off device, and an automatic piling up device, substantially as shown and described.

13. In a machine for making waist bands, the combination of a double quadrant for feeding the bands, a cutter secured to one quadrant, a gripping device secured to the other quadrant, an adjustable marking device, an inking device, an auxiliary feeding device, and a tilting piling up device, substantially as shown and described.

14. In a machine for making waist bands, the combination with a double quadrant, of a wheel for coöperating with the quadrant, a folder, a pair of pressure rollers, a brake located between the pressure rollers and the quadrants, a tension device, a driving wheel and means for actuating the quadrant and wheel from the driving wheel, substantially as shown and described.

15. In a machine for making waist bands, the combination with a double rotary quadrant of adjustable spring actuated marking devices, a spring actuated numbering device, a spring actuated gripping device, a cutter, a block for coöperating with the cutter, a pair of pressure rollers, a pair of auxiliary feeding off rollers, and a tilting piling up device, substantially as shown and described.

16. In a machine for making waist bands, a quadrant for feeding and measuring the bands, means for holding the bands from slipping, means for cutting the bands in a predetermined length, marking, numbering and gripping devices carried by the quadrants, an auxiliary feeding off device and a piling up device, substantially as shown and described.

17. In a waist band making machine, the combination of an adjustable quadrant comprising two members, a wheel for coöperating with the quadrant for feeding the band, a cutter attached to one member of the quadrant, a gripping device attached to the other member of the quadrant, a block on the roller for coöperating with the cutter and means substantially as shown and described for measuring the bands, substantially as shown and described.

18. In a machine for making waist bands the combination with relatively adjustable quadrants for feeding the band, means independent of the quadrants comprising a disk for marking the position of the buttonholes, means for marking the number on the bands, means for cutting the bands in predetermined lengths, and means for piling up the cut bands, substantially as shown and described.

19. In a machine for folding, pressing, measuring, marking and cutting off waist bands, a folder for folding the bands, a rotary adjustable quadrant, a series of spring actuated marking devices, a rotary inking device, a spring actuated numbering device, a gripping device, a cutting device, and means for piling up the finished bands, substantially as shown and described.

20. In a machine for making waist bands, the combination of a folder for folding the band, a presser roller, an adjustable quadrant for feeding the band, a brake for the band located between the pressure roller and quadrant, a tension device located between the quadrant and brake device, a cutter, an auxiliary feeding off roller, and a piling device substantially as shown and described.

21. In a machine for making waist bands, a double quadrant having relatively adjustable sections for feeding and measuring the bands, a cutter carried by one of the sections for cutting the bands in predetermined lengths, adjustable means for marking the position of the button holes, means for numbering the bands and means for piling up the bands, substantially as shown and described.

22. In a machine for making waist bands, a quadrant for feeding the bands, a marking device for marking the position of the buttonholes, a folder, a presser roller, a brake device located between the presser roller and the quadrant, a gage device located between the brake device and the quadrant for guiding the bands to the quadrant in proper position to be acted on by the marking device substantially as shown and described.

23. In a machine for making waist bands a double adjustable quadrant for feeding and measuring the bands, means for cutting the bands in predetermined lengths, an adjustable marking device, a numbering device, and inking device, a gripping device, a folder for folding the band, a presser roller, a brake device, a gage, a feeding off device, and a piling up device, substantially as shown and described.

24. In a machine for making waist bands, a quadrant for feeding the bands, a wheel for coöperating with the quadrant, means for supporting the quadrant when out of contact with the wheel, means for measuring and cutting the bands, marking, numbering and gripping devices, a folder, a presser roller, a feeding off device, and a piling up device substantially as shown and described.

Signed at New York city in the county of New York and State of New York, this seventh day of February, A. D. 1919.

GEORGE W. WEISS.

Witnesses:
SAMUEL M. OLSEN,
IRVING SCHRECKINGER.